(12) United States Patent
Zellweger (10) Patent No.: US 6,397,222 B1
(45) Date of Patent: May 28, 2002

(54) METHOD AND APPARATUS FOR END-USER MANAGEMENT OF A CONTENT MENU ON A NETWORK

(76) Inventor: Paul Zellweger, 82 Fresh Pond La., Cambridge, MA (US) 02138

( * ) Notice: Subject to any disclaimer, the term of this patent is extended or adjusted under 35 U.S.C. 154(b) by 0 days.

(21) Appl. No.: 09/362,373

(22) Filed: Jul. 28, 1999

Related U.S. Application Data (60) Provisional application No. 60/095,809, filed on Aug. 7, 1998.

(51) Int. Cl.⁷ ............................................... G06F 17/00
(52) U.S. Cl. ..................... 707/102; 707/103; 707/104.1; 707/533; 345/854
(58) Field of Search ............................... 707/1–10, 100, 707/101, 102, 104; 345/854

(56) References Cited

U.S. PATENT DOCUMENTS

| | | | | |
|---|---|---|---|---|
| 5,257,185 A | * | 10/1993 | Farley et al. ............... | 707/100 |
| 5,630,125 A | * | 5/1997 | Zellweger .................... | 707/104 |
| 5,848,410 A | * | 12/1998 | Walls et al. ................. | 707/104 |
| 6,003,040 A | * | 12/1999 | Mital et al. .................. | 707/103 |
| 6,078,924 A | * | 6/2000 | Ainsbury et al. ........... | 707/101 |
| 6,088,717 A | * | 7/2000 | Reed et al. .................. | 707/104 |
| 6,131,098 A | * | 10/2000 | Zellweger .................... | 707/104 |
| 6,131,100 A | * | 10/2000 | Zellweger .................... | 707/104 |
| 6,144,968 A | * | 11/2000 | Zellweger .................... | 707/104 |
| 6,154,213 A | * | 11/2000 | Rennison et al. ........... | 707/104 |
| 6,124,700 A1 | * | 6/2001 | Zellweger .................... | 707/102 |
| 6,301,583 B1 | * | 10/2001 | Zellweger .................... | 707/103 |

* cited by examiner

Primary Examiner—Kim Vu
Assistant Examiner—Anh Ly (57) ABSTRACT

The present disclosure teaches how to create a self-service content menu that enables individual providers to add menu paths to a content menu and links to their content on a network. Using password protection access the present invention controls what menu changes end-users can make. As a general purpose technology applications of the present invention include self-service content menus build and managed by users that range from the single user to a community of users on an Intranet or at a portal site.

18 Claims, 11 Drawing Sheets

PRIOR ART

| NODE | TOPIC | PARENT | CHILD | LEVEL | URL | UID |
|---|---|---|---|---|---|---|
| 30 | Content Menu | NULL | 31 | 0 | - | |
| 31 | Directors | 30 | ... | 1 | - | |
| 32 | Employees | 30 | 38 | 1 | - | |
| 33 | Departments | 30 | 38 | 1 | - | |
| 34 | Services | 30 | ... | 1 | - | |
| 35 | Accounting | 31 | ... | 2 | - | |
| 36 | Human Resources | 31 | 41 | 2 | - | |
| 37 | Legal | 31 | 43 | 2 | - | |
| 38 | Inhouse | 32 | ... | 2 | - | |
| 39 | Onsite Consulting | 32 | 46 | 2 | - | |
| 40 | Outside Consulting | 37 | ... | 3 | - | |
| 41 | Contracts | 37 | 46 | 3 | - | |
| 42 | Trademarks | 38 | ... | 3 | - | |
| 43 | Audit | 38 | -1 | 3 | - | |
| 44 | Contracts | 38 | -1 | 3 | - | |
| 45 | Information Services | 44 | -1 | 4 | www.acme.com/contract/consul.html | 1256 |
| 46 | Consulting Services | 44 | | 4 | www.acme.com/contract/equip.html | 6448 |
| 47 | Equipment Purchase | 44 | | 4 | www.acme.com/contract/lease.html | 128 |
| 48 | Lease | | | | | |
| ... | | | | | | ... |

METHOD AND APPARATUS FOR END-USER MANAGEMENT OF A CONTENT MENU ON A NETWORK

CROSS REFERENCE TO RELATED APPLICATION

This application is based on Provisional Application No. 60/095,809 entitled Method and Apparatus for Linking a Web Page URL to a Content Index, filed Aug. 7, 1998.

REFERENCES

U.S. Patent Documents

| | | |
|---|---|---|
| 09/353,153 | 07-1999 | Zellweger |
| 6,088,717 | 08-1998 | Reed et al. |
| 6,154,213 | 05-1998 | Rennison et al. |
| 6,131,100 | 03-1998 | Zellweger |
| 6,131,098 | 03-1998 | Zellweger |
| 6,144,968 | 02-1998 | Zellweger |
| 6,078,924 | 01-1998 | Ainsbury et al. |
| 6,003,040 | 01-1998 | Mital et al. |
| 5,848,410 | 10-1997 | Walls et al. |
| 5,630,125 | 05-1994 | Zellweger |
| 5,257,185 | 05-1990 | Farlet et al. |

Other References

Zellweger, Paul. "Web-based Sales: Defining the Cognitive Buyer." *International Journal of Electronic Markets*. Vol. 7 No. 3, 1997. pp. 16–22.

Zellweger, Paul. *The Knowledge Tree*. unpublished paper, Jan. 3, 1998.

BACKGROUND

The content menu and its underlying open hierarchical data structure provides an extremely effective way to organize a collection of information and make it available to end-users. A major benefit of this approach is that information can be stored and looked up using equivalent menu topics (Zellweger U.S. Pat. No. 5,630,125), something prior binary menu structures simply cannot do.

Using the open hierarchical data structure to organize information on a network like the World Wide Web makes perfect sense. The environment is rich with detailed information and its users are drawn to its self-service orientation. Zellweger (Ser. No. 09/080,102) now U.S. Pat. No. 6,301,583, discloses how to create a hypertext-based content menu that is optimized for traffic on the Web. In another disclosure, Zellweger (Ser. No. 09/080,100) now U.S. Pat. No. 6,243,700, teaches bow to use an open hierarchical data structure to generate menu data for a Java-based content menu that is optimized for client server communication on the Web. Yet neither one of these disclosures shows how to accept topics and links from content providers on the Web in a self-service fashion.

More recently, Zellweger (No. 60/095,808) discloses how to generate a self-service system that enables individual content providers on a network to add topics and links to a content menu that serves as central directory assistance on the Web. The system employs a highly structured menu-based approach that does not allow individual contributors to introduce new menu paths or change an existing one. The disclosure limits changes to adding topics and links to an existing structure. In contrast, the present invention overcomes this restriction by enabling contributors to build and change menu paths in the underlying menu structure, thereby broadening its self-service appeal to users.

In the present invention a content provider navigates the Web using a commercially available browser. When relevant information is located software associated with the present invention is invoked, enabling the end-user to create and change paths in an existing content menu and link the browser's current location to the menu's underlying structure.

The present invention is a general purpose self-service system that enables knowledge workers, nontechnical professionals, and even hobbyists to organize information on a network. In a corporate setting the invention can be used on a home page to link to information on servers throughout the Intranet. Individual content providers build and maintain the directory system, in a self service fashion, by adding links to their content on different servers. On a smaller scale, an individual can use the invention to organize personal information such as bookmarks or email addresses. In any case, the present invention removes the prior technical demands associated with building and maintaining a content menu by limiting the number of functions and by introducing a simple topic string command to create a new menu path.

SUMMARY OF THE INVENTION

The present invention improves the prior art of the content menu by disclosing a self-service component that enables end-users to make changes to a menu structure and link their online network content to it. End-users employ commercially available browsers like Netscape Navigator to navigate hyperlinks in a network like the World Wide Web to locate a relevant information object. When software associated with the present invention is invoked from the browser a configuration user interface is displayed. The configuration user interface accepts a predefined notation that enables a contributor to supply a topic string command to create a new menu path in an existing content menu. The interface also includes an interactive content menu and the controls to add and change its menu topics. The end-user contributor uses the present invention to designate a path or create a new one, by the command sting or by the content menu, and link the network address or Universal Resource Locator (URL) of the information object to it.

DETAILED DESCRIPTION OF THE FIGURES

Figure 1:
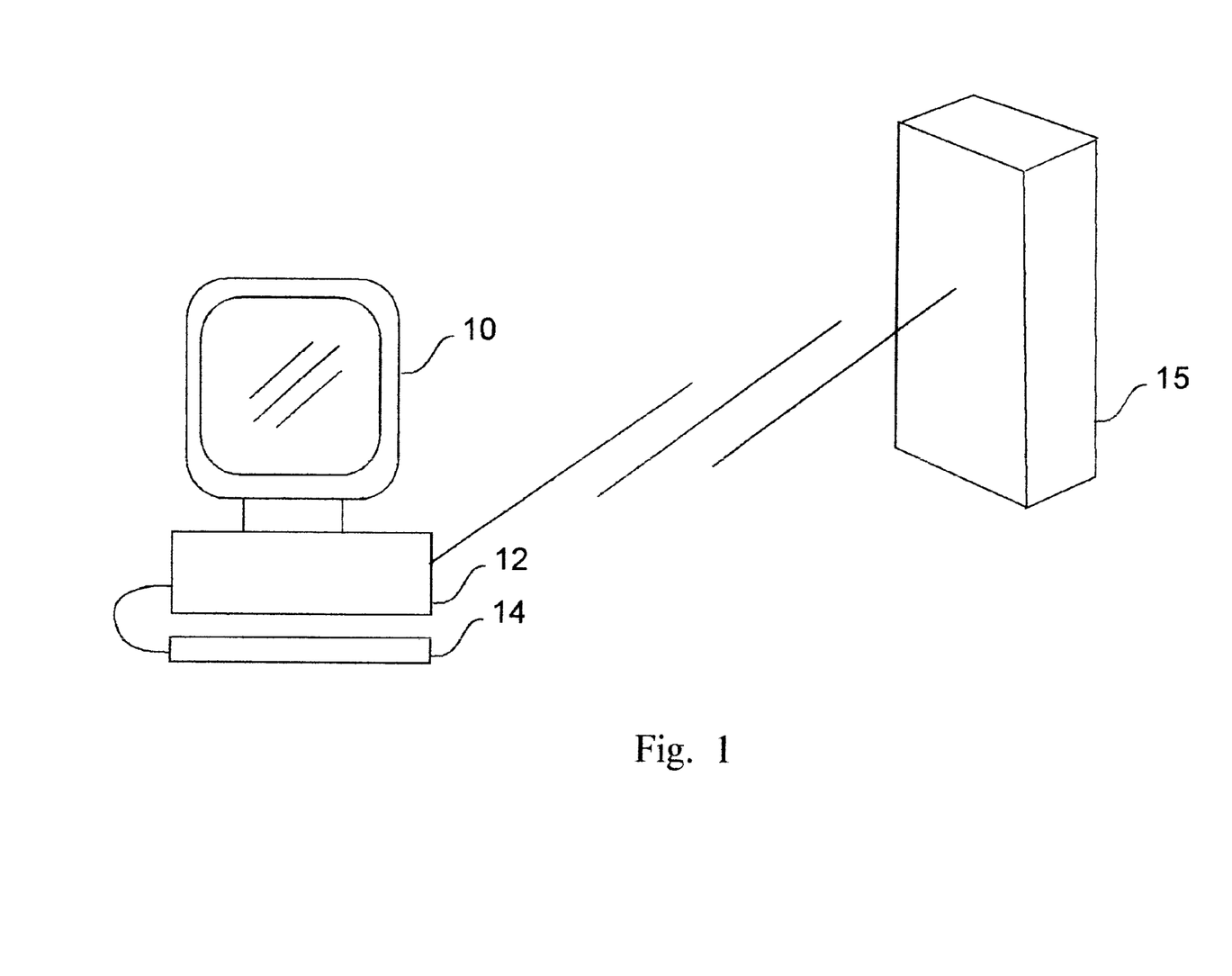
FIG. 1 depicts a graphic representation of the client server apparatus of the present invention.

FIG. 1 depicts the client server apparatus of the present invention. The server computer 15 contains operating system, database system, and communications software. It also includes information resources or electronically coded files that are processed by browser software on a client computer 12. A client computer 12 is linked electronically to a server computer 15 through network software. The client computer 12 has its own operating system, browser, and communications software. The graphical user interface (GUI) created by its browser software is displayed on monitor 10. Input from an end-user contributor on client 12 is received via a keyboard 14 and a pointing device like mouse.

Figure 2:
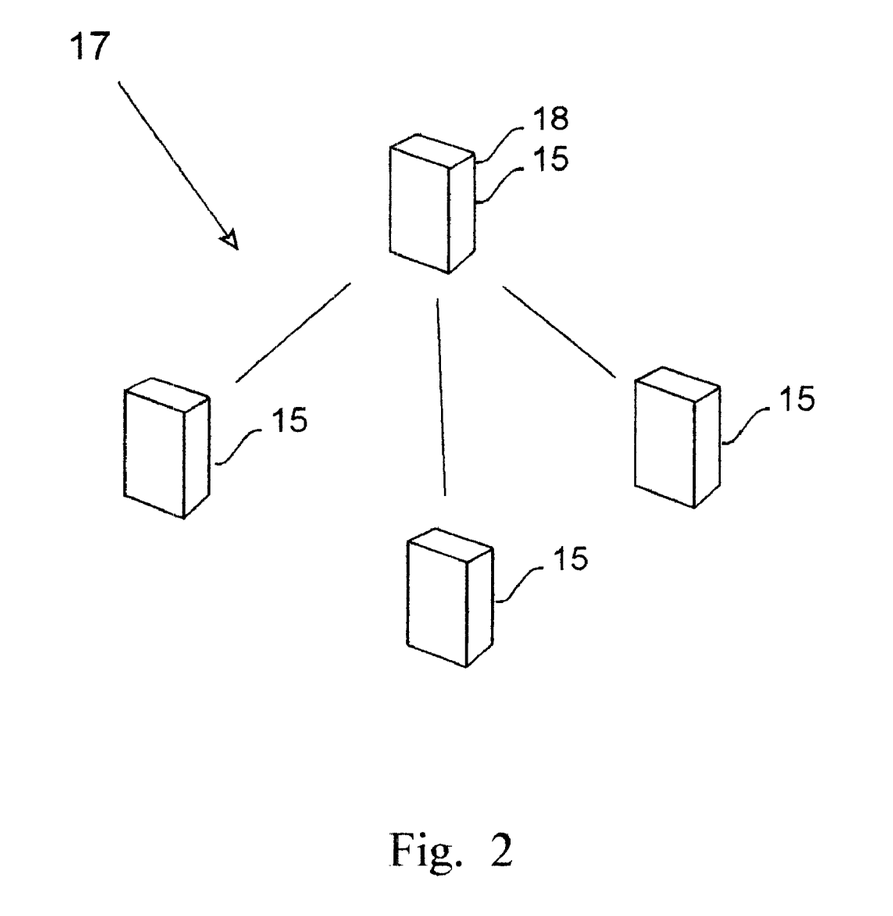
FIG. 2 depicts a graphic representation of the network apparatus of the present invention that includes multiple servers.

The network apparatus 17 of the present invention, depicted in FIG. 2, includes more than one server 15. In one type of application of the present invention, server 18 in network 17 represents a central point or a home page to information on one or more servers in the network. Individuals responsible for content on these servers can use the present invention to build and maintain a central content management system that links to their information. In operation, network 17 represents any number of organizational and commercial configurations including Extranets, Intranets, and portal sites.

Alternative applications of the present invention also include its use by an individual on a client 12 in network 17. In this setting network 17 represents environments like the all encompassing World Wide Web. The individual uses the present invention, as mentioned previously, to organize personal information such as bookmarks or email.

Figure 3:
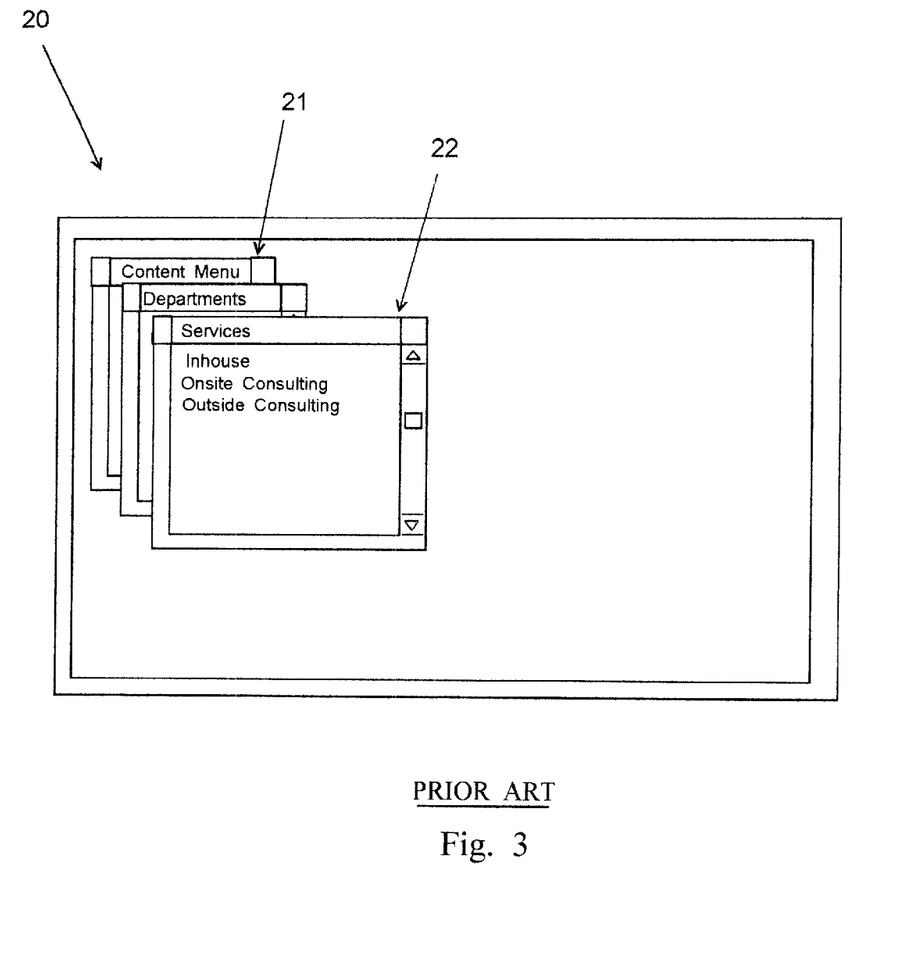
FIG. 3 depicts a graphic representation of the prior art of the content menu.

The prior art of the content menu is depicted in FIG. 3. Window 20 on client 12 monitor 10 displays content menu 21. Content menu 21 consists of one or more list menus 22. Each list menu 22 consists of a menu title, one or more list entries and, if needed, a scrolling device. Each time an end-user selects a topic entry in list menu 22, content menu 21 either generates a successor list menu 22 that refines the selected topic or 21 displays the information object linked to the selected list menu entry.

In the hypertext based embodiment of content 21, the browser window 20 can be divided into more than one frame where one of more frames display list menu 22 and others display information. In another technical embodiment of 21 such as an applet, each list menu 22 displays in a pop-up fashion across the browser window 20 till an information object is reached at the end of a menu path.

Figure 4:
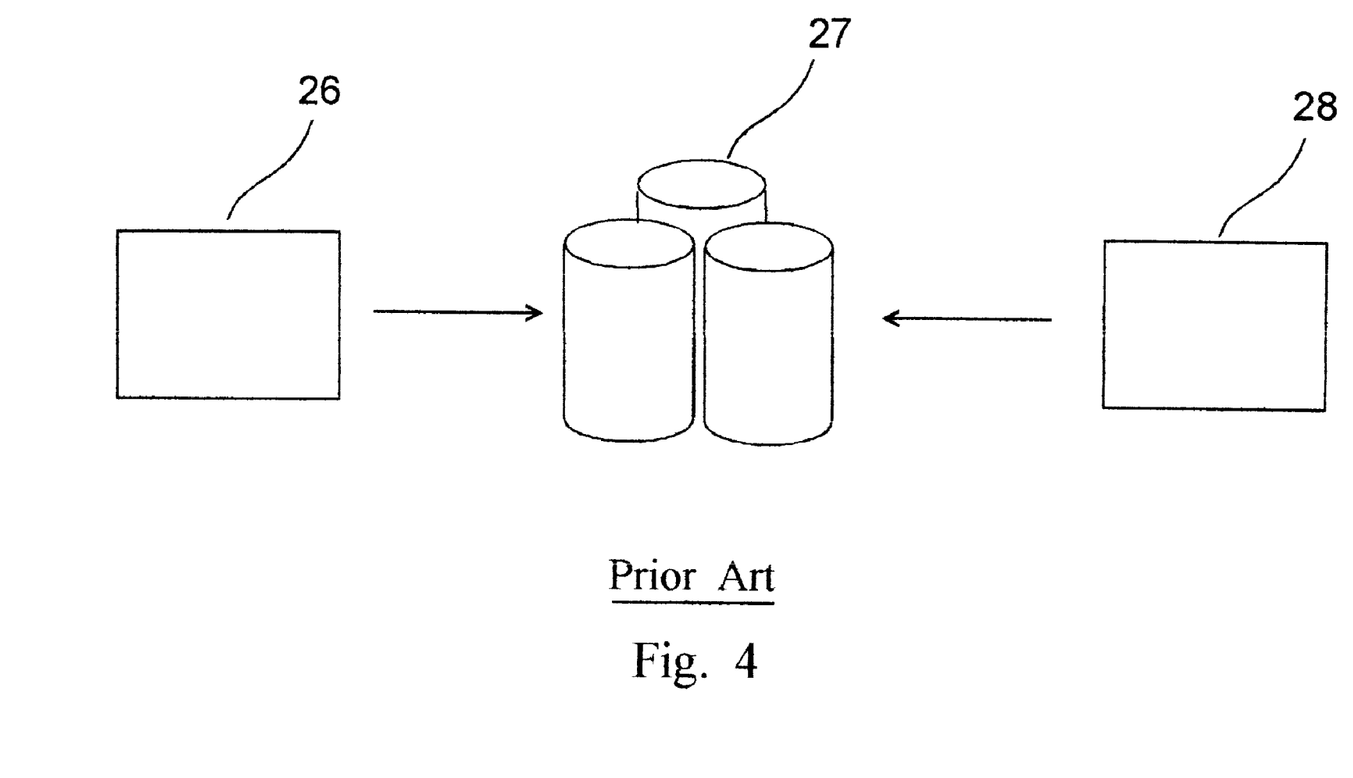
FIG. 4 depicts the prior art of the primary software components of the content menu management system.

The primary software components of the prior content menu 21 are depicted in FIG. 4. An authoring system 26 generates one or more menu files 27 that represent one or more list menus like 22. Browser software 28 accesses menu files 27 to display one or more list menu 22 in content menu 21.

The prior art of authoring system includes an extensive array of tools and utilities to build and manage an open hierarchical data structure, the basis for the content menu. Unfortunately, the number of options can overwhelm the casual user. The present disclosure overcomes this problem by limiting the number of command options in the self-service interface of the present invention The prior art of authoring system 26 also includes a password protection menu access and systems used by an administrator to maintain a database of users. Improvements brought about by the present invention add new functions to authoring system 26 that enable the administrator to authorized content providers to create and manage menu paths in 21 and link information objects to it in a self-service fashion.

Figure 5:
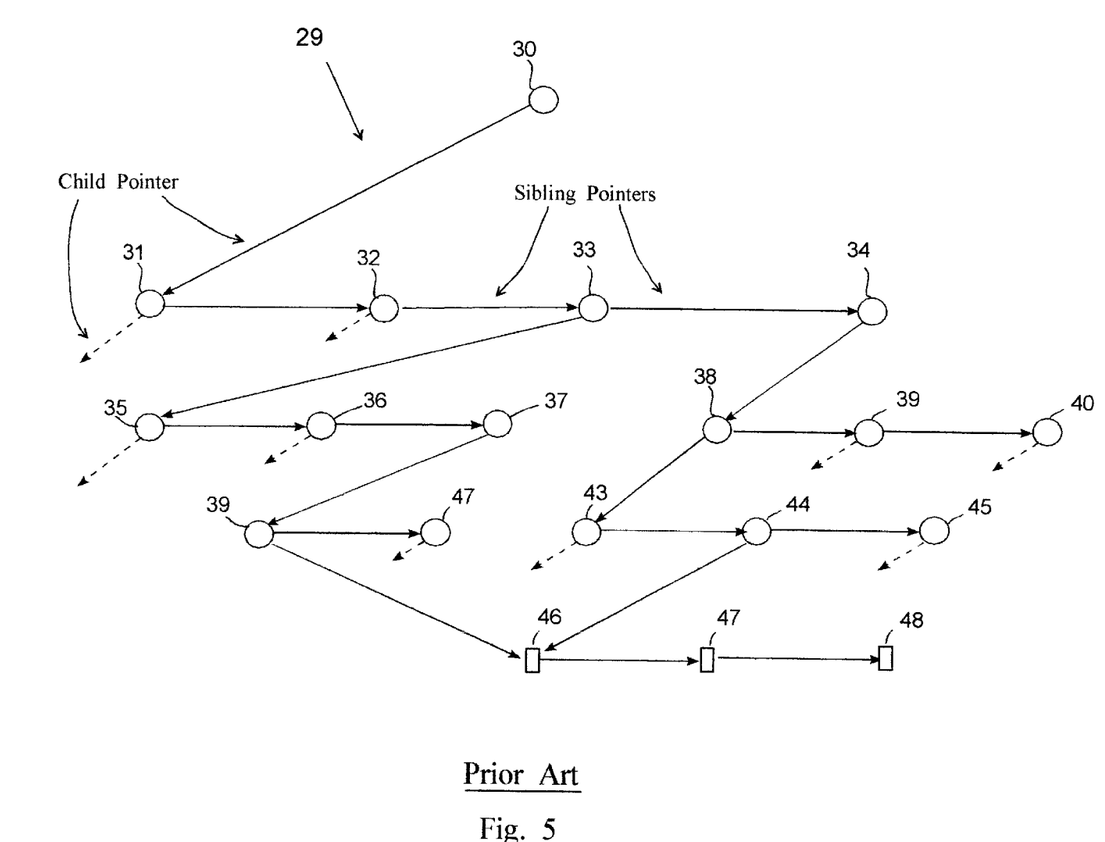
FIG. 5 depicts a graphic representation of the prior art of an open hierarchical data structure, the basis for the content menu.

Content menu 21 is based on the prior art of the open hierarchical data structure 29 depicted in FIG. 5. Information keys or topics associated with nodes in structure 29 provide the basis for list menu 22 in content menu 21. The unique and distinctive feature of structure 29 and the menu system 21 is that it allows multiple paths to flow from a root node 30 to the same leaf node 46 at the bottom of the structure.

In structure 29 flow progresses downward from root node 30 through a branching node like node 34 or node 38, to a leaf node 46 (a.k.a. data node) at the end of a path in the structure. Branching nodes store topics or information keys that organize information objects under categories or topics. Leaf or data nodes, on the other hand, contain links, such as www.acme.com/contract/consul.html, to information on the network.

Each node below root 30 can has a sibling and a child link, arc, or pointer. Sibling pointers represent topic lists associated with 22 and child pointers link an entry in a list 22 to its next object, either another list 22 or an information object. Nodes below root 30 can have more than one incoming arc or parent node, like node 46, that can be reached by two different lists. In effect these incoming arcs enable the content menu 21 to use multiple topics and menu paths to reach the same Web page.

Figure 6:
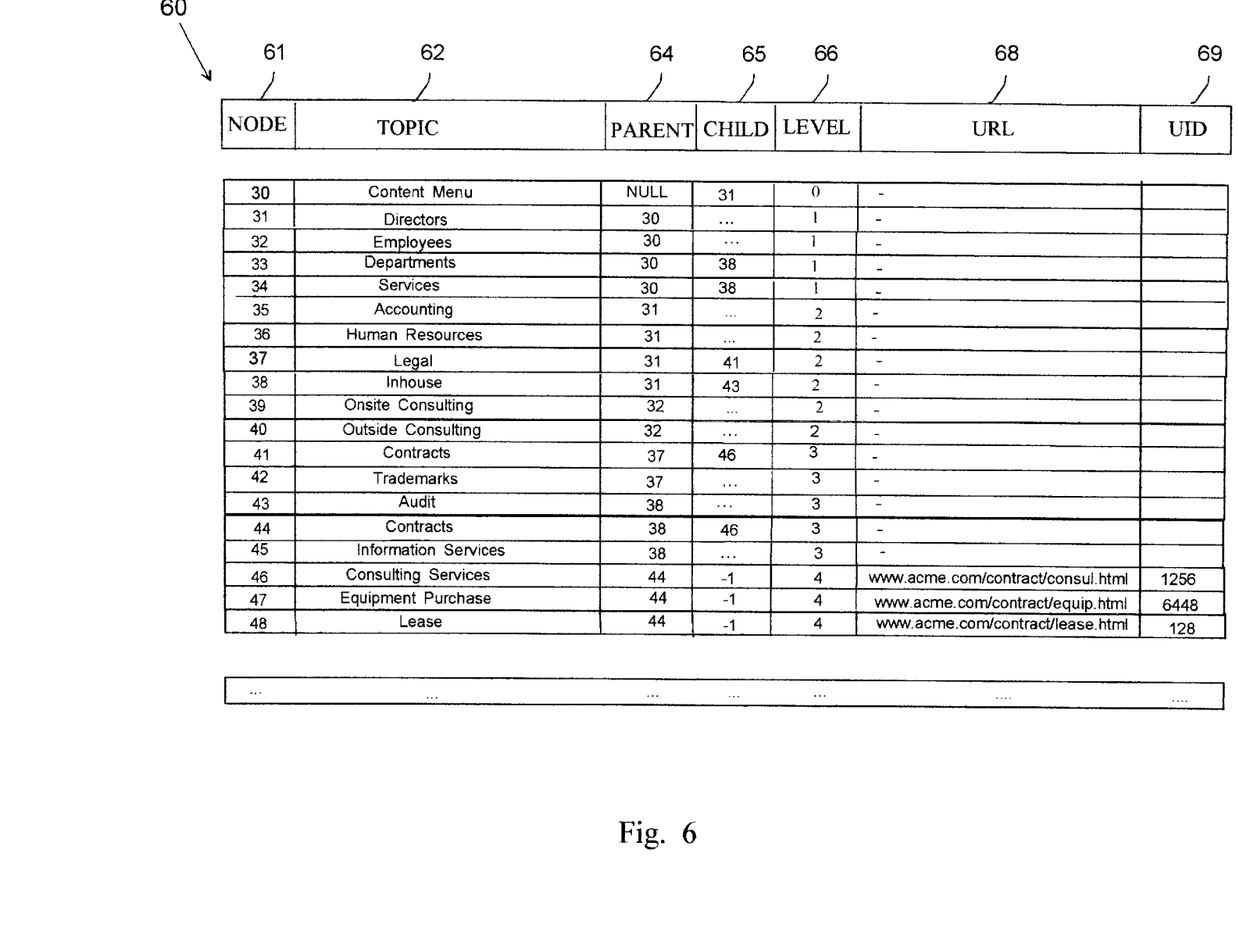
FIG. 6 depicts the database structure that represents nodes in an open hierarchical data structure of the present invention.

In the preferred embodiment of the present invention a database structure 60, depicted in FIG. 6, represents nodes in structure 29. Each node in database 60 has a unique identifier in NODE 61, an information key such as TOPIC 62, and PARENT 64 and CHILD 65 links. In addition, database structure 6 also includes URL 68, a place to store a link to an information on the network and UID 69, an identifier associated with the person who added the topic. A predefined value in CHILD 65, such as −1, designate a node as a data node and signify that it is the last node in a menu path. In this context, URL 68 represents the child link to an information object on the network.

Authoring system 26 of the present invention uses the prior art of password protection and an end-user database to restriction end-user changes made to the underlying menu structure. When an end-user is authorized to add topics to menu structure 60 authoring system 26 assigns UID 69 to each topic node. Later on, authoring 26 of the present invention uses UID 69 to restrict access to change or delete a topic to the original end-user.

Figure 7:
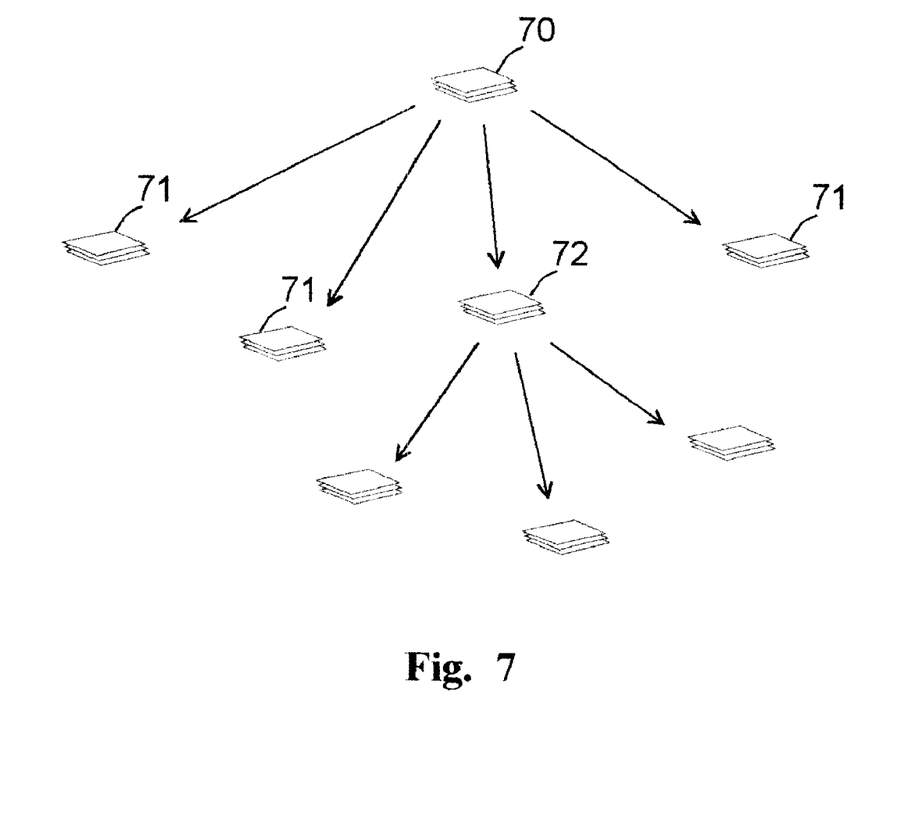
FIG. 7 depicts the directory structure of a set of hypertext files on a Web site.

A URL on a network like the World Wide Web represents a file on a server 15. These files, symbolically represented in FIG. 7, are logically grouped together in one or more directories on server 15. Each directory 70 can contain subdirectories 71 which, in turn, can contain further subdirectories 72. A predefined notation is used to refer to such a directory path and file location, i.e., "acme.com/contract/consul.html." This predefined notation serves as a convention that has been applied to network links known as a Universal Resource Locator (URL).

Figure 8:
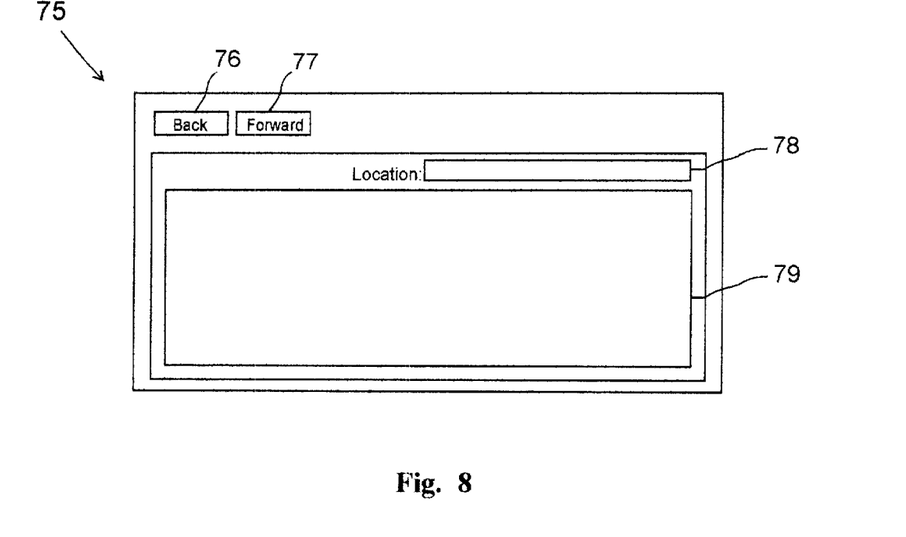
FIG. 8 depicts a graphic representation of a browser on a network.

A commercially available browser on the Web includes user controls to navigate links on the Web. FIG. 8 depicts a graphical representation of such a browser and its user controls. Browser interface 75 displays on monitor 10 of client computer 12. Browser software associated with 75 requests hypertext files stored on server computer 15 and creates their user interface in window 79.

Hypertext files include source code formats like HTML, as well as other predetermined file formats that merge content and links to content. These links connect to content within the same hypertext file and to content in files on servers throughout the network. Source code in a hypertext file like HTML includes the URL of the destination location. When the end-user clicks on a hyperlink software under the control of the browser uses the URL to fetch content associated with the designated location. The URL or logical address essentially refers to a virtual location on a memory device managed by server computer 15, using a predefined directory path and file specification notation.

Hyperlinks on a Web page can go in any direction so an end-user can navigate through a series of locations that does not necessarily progress in an orderly or linear fashion. Yet, the browser software keeps track of each location visited so end-users can retrace a path they had taken. Selecting Back button 76 in 75 end-users can step back to a prior location and then proceed forward using Forward button 77. In any case, Location field 78 in browser interface 75 always displays the URL associated of the current information object displayed in the browser window 79.

End-users employ browser software 75 to locate and display an information object in the browser window 79. When they have reached relevant information objects on the network they use the present invention to add the URL or information object address on a network to menu data in structure 60. Software associated with the present invention is password protected and maintained by the prior art of authoring system 26. This enables administrators to exercise control over who can add topics to the underlying menu structure, and to restrict changes or deletions to contributors of such topics.

Figure 9:
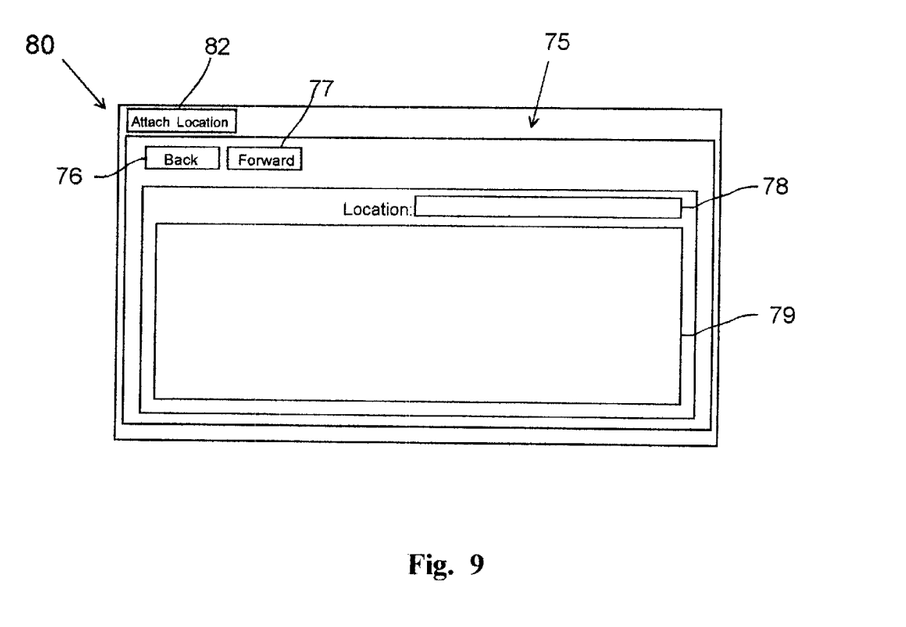
FIG. 9 depicts an interface that includes a component of the present invention and a Web browser used to connect a location to an open hierarchical data structure.

In one embodiment of the present invention, menu interface 80, depicted in FIG. 9, surrounds the browser interface 75 and enables an end-user to bind a URL in Location 78 to structure 60 when Attach Location button 82 is selected. When this occurs configuration menu 90 is displayed and prompts the end-user for additional information to complete the procedure. In an alternative embodiment of the present invention the end-user invokes configuration menu 90 using a series of pre-defined keys on keyboard 14. In either case, authoring system 26 of the present invention limits access to configuration interface 90 to authorized users.

Figure 10:
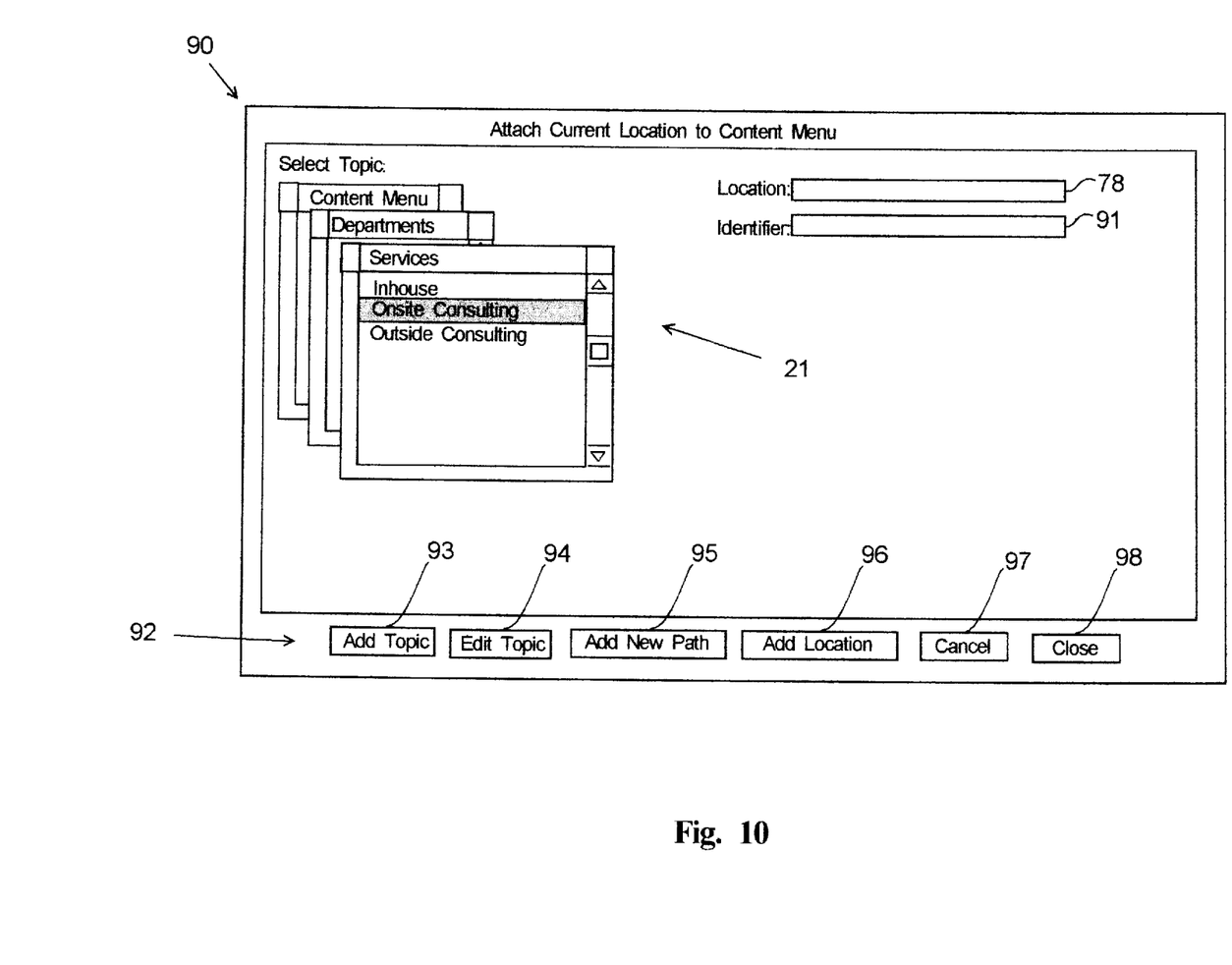
FIG. 10 depicts the configuration interface of the present invention used to link a URL to an open hierarchical data structure.

Configuration interface 90, displayed in FIG. 10, enables an end-user to make changes to content menu 21 and link a location displayed in 78 of browser interface 75 to a menu path in structure 60. There are at least two different ways to change the underlying menu structure with the present invention. An end-user can supply a topic string command to Identifier at 91 in window 90, or she can use commands in region 92 of 90.

When configuration interface 90 displays on monitor 10 of client 12 software associated with the present invention fetches the URL in Location 78 of browser 75 and displays it in 78 of 90. Otherwise the end-user is required to fill in Location 78 in 90 with the current URL.

The end-user contributor fills in Identifier 91 in 90 with a topic string that best describes the information object. As mentioned earlier, the topic string can also represent a command to create a new menu path in the underlying menu structure. The topic string command adheres to a predefined notation that represents a set of successive topics in a menu path such as a series of topics separated by a colon, i.e., "Departments:MIS:Decision Support Systems", where each colon represents the next consecutive level in structure 29.

The present invention parses the topic string command to verify that each topic in the path does not duplicate a topic in a existing path in structure 29. If a new path sequence is detected by the authoring system 26 in the present invention, window 90 highlights Add New Path in 92 by framing it in a bold outline. In this situation, the end-user can only select the Add New Path 95 or Cancel 97 buttons otherwise Add Location 96 or Cancel 97 in region 92 is highlighted.

An alternative way to create a new menu path entails the Add Topic 93 and Change Topic 94 buttons in region 92 of 90. First, the end-user navigates content menu 21 in 90 to a particular list menu 22. Doubling clicking on a topic in 22 of 21 brings the end-user to the next list menu 22 or information object. Note that in configuration interface 90, a list menu 22 in 21 can be an empty set. To add a topic to the current list menu 22 the end-user selects Add Topic 93 for prompts to receive input from the end-user.

Other commands in region 92 of interface 90 include Cancel 97 that resets content menu 21 and clears Identifier 91 and Close 98 that returns control to browser 75.

Figure 11A:
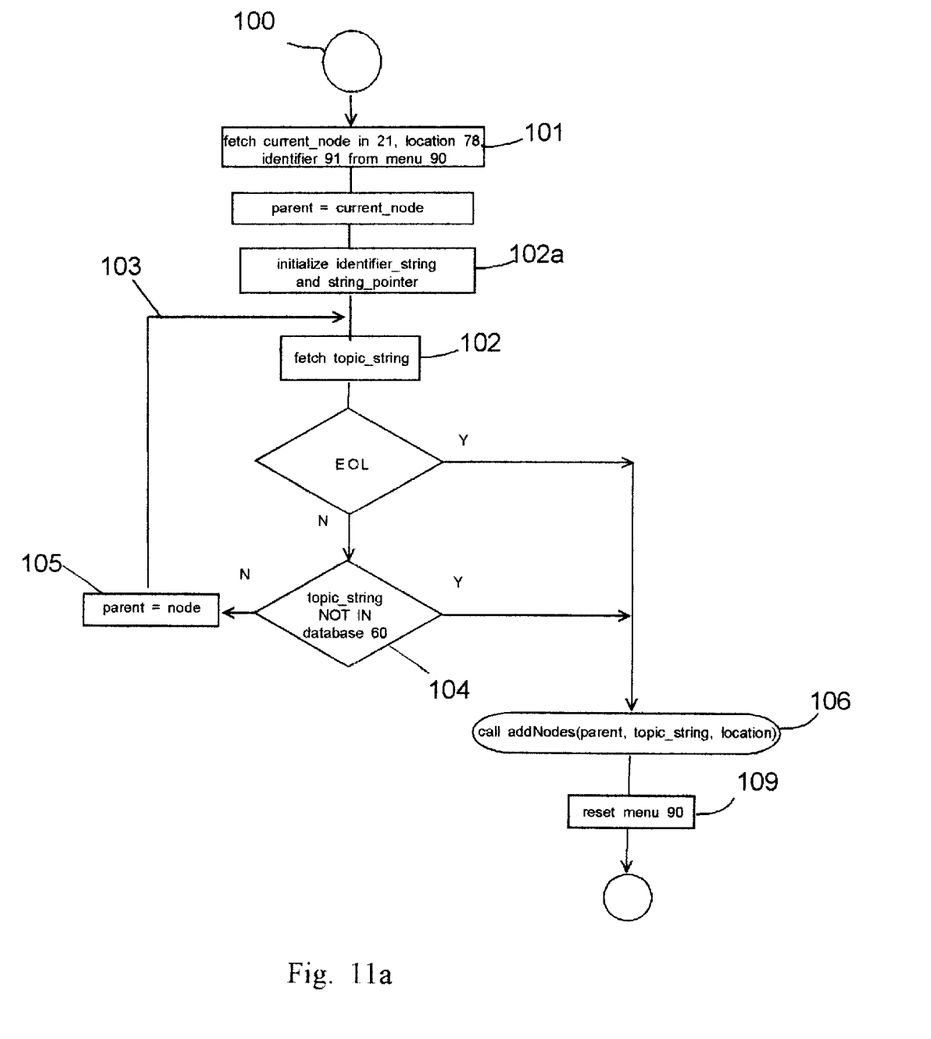
FIGS. 11a and 11b depict the flow chart of the present invention that adds a node to the open hierarchical data structure that links to an information object on a network.
Figure 11B:
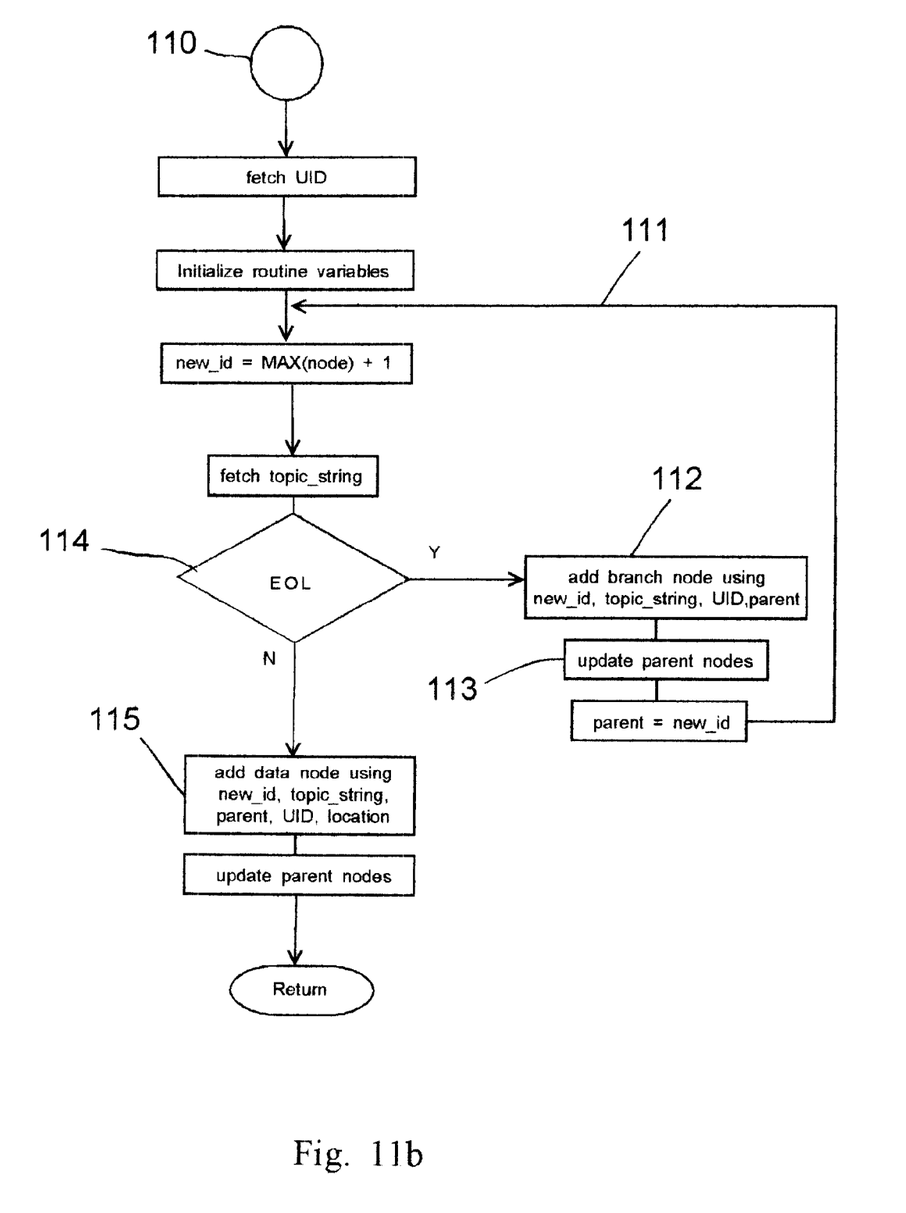

FIGS. 11a and 11b depict the flow chart of the program logic associated with configuration window 90 of the present invention when Add New Path 95 or Add Location 96 is selected in menu 90. These commands enable an end-user to link the URL of the current information object in 78 displayed by browser 75 to the underlying menu structure and to change its menu paths. These routines use string_pointer to parse input supplied by the end-user to Identifier 92 in 90.

Program routine 100, depicted in FIG. 11a, parses string_pointer to fetch topics supplied by the end-user. First, 100 fetches end-user input from menu 90, such as current_node in 21, Location 78, Identifier 91, and initializes routine variables. Next, it parses through string_pointer to get each topic, assign it to topic_string, set the parent variable, and look up nodes in database 60 in loop 103. Each time a topic_string and parent is located in database 60 loop 103 fetches the next topic and updates parent variable. When a topic_string and parent pair is not found in 60 or end of line is detected control diverts to 106 and a call to addNodes is made at 108. Upon return routine 110 resets menu 90 before it returns control to the event manager.

Routine 110, addNodes, is depicted in FIG. 11b. First, it fetches the UID associated with the current user and initializes routine variables to parse through topics in topic_string. Next, control drops to loop 111 where each new topic gets added to 60 as a branch node. At 113 routine 110 updates one or more parent nodes. When end of line is detected in topic_string at 114 routine 110 adds a data node to 60 that stores the URL associated with 78 in 90.

CONCLUSION

This concludes the description of an embodiment of the invention. The foregoing description of the embodiment of the invention has been presented for the purpose of illustration and description. It is not intended to be exhaustive or limit the invention to the precise form disclosed. Many modifications and variations are possible in light of the above teaching. The scope of the present invention is not intended to be limited by this detailed description, but rather by the claims appended hereto.

Having described an embodiment of the invention we claim:

1. A self-service component of a content management system on a network consisting of,
   creating an open hierarchical data structure consisting of links and topic nodes that form paths to information objects linked to topic nodes at the bottom of said open hierarchical data structure,
   displaying a content menu based on said open hierarchical data structure,
   navigating links on said network and locating a relevant information object using a browser,
   associating a network address with said relevant information object,
   executing said self-service component from said browser,
   displaying a configuration interface associated with said self-service component,
   fetching an end-user input from said configuration interface that represents a set of topics in a path proposed for said open hierarchical data structure,
   checking each topic in said end-user input for an existing topic node in said open hierarchical data structure,
   adding a topic node to said open hierarchical data structure that does not duplicate said existing topic node,
   linking said topic node to said relevant information object,
   displaying said relevant information object when selecting said topic node in said content menu.

2. The self-service component in said content management system of claim 1 is implemented in a computer program language that is compatible with at least one computer operating system.

3. The self-service component in said content management system of claim 1 wherein further includes restricting access to said configuration interface to an authorized user.

4. The self-service component in said content management system of claim 1 wherein further includes restricting access to deleting a topic node in said open hierarchical data structure.

5. The self-service component in said content management system of claim 1 wherein further includes restricting access to changing information associated with a topic node in said open hierarchical data structure.

6. The self-service component in said content management system of claim 1 wherein said end-user input further includes a topic string command, a predefined notation that represents said set of topics in said proposed path for said open hierarchical data structure.

7. The self-service component in said content management system of claim 1 wherein said configuration interface further includes said content menu.

8. The self-service component in said content management system of claim 1 wherein said configuration interface further includes a command to add a topic node to a list menu in said content menu in said configuration interface.

9. The self-service component in said content management system of claim 1 wherein said configuration interface further includes displaying feedback information on said path proposed for said open hierarchical data structure.

10. A self-service component of a content management system on a network consisting of,
    the means for creating an open hierarchical data structure consisting of links and topic nodes that form paths to information objects linked to topic nodes at the bottom of said open hierarchical data structure,
    the means for displaying a content menu based on said open hierarchical data structure,
    the means for associating a network address with said self-service component,
    the means for displaying a configuration interface associated with said self-service component,
    the means for fetching an end-user input from said configuration interface that represents a set of topics in a path proposed for said open hierarchical data structure,
    the means for checking each topic in said end-user input for an existing topic node in said open hierarchical data structure,
    the means for adding a topic node to said open hierarchical data structure that does not duplicate said existing topic node,
    the means for linking said topic node to said relevant information object,
    the means for displaying said relevant information object when selecting said topic node in said content menu.

11. The self-service component in said content management system of claim 10 is implemented in a computer program language that is compatible with at least one computer operating system.

12. The self-service component in said content management system of claim 10 wherein further includes the means for restricting access to said configuration interface to an authorized user.

13. The self-service component in said content management system of claim 10 wherein further includes the means for restricting access to deleting a topic node in said open hierarchical data structure.

14. The self-service component in said content management system of claim 10 wherein further includes the means for restricting access to changing information associated with a topic node in said open hierarchical data structure.

15. The self-service component in said content management system of claim 10 wherein said end-user input further includes a topic string command, a predefined notation that represents said set of topics in said proposed path for said open hierarchical data structure.

16. The self-service component in said content management system of claim 10 wherein said configuration interface further includes said content menu.

17. The self-service component in said content management system of claim 10 wherein said configuration interface further includes the means for adding a topic node to a list menu in said content menu in said configuration interface.

18. The self-service component in said content management system of claim 10 wherein said configuration interface further includes the means for displaying feedback information on said path proposed for said open hierarchical data structure.

* * * * *